United States Patent
Zhang et al.

(10) Patent No.: US 10,326,574 B2
(45) Date of Patent: Jun. 18, 2019

(54) METHOD AND DEVICE FOR CONFIGURING A PILOT

(71) Applicant: ZTE Corporation, Shenzhen (CN)

(72) Inventors: Xin Zhang, Shenzhen (CN); Wenfang Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 153 days.

(21) Appl. No.: 15/511,446

(22) PCT Filed: Dec. 10, 2014

(86) PCT No.: PCT/CN2014/093508
§ 371 (c)(1),
(2) Date: Mar. 15, 2017

(87) PCT Pub. No.: WO2015/154505
PCT Pub. Date: Oct. 15, 2015

(65) Prior Publication Data
US 2017/0257202 A1    Sep. 7, 2017

(30) Foreign Application Priority Data

Sep. 15, 2014  (CN) .......................... 2014 1 0468396

(51) Int. Cl.
*H04L 5/00* (2006.01)
*H04L 27/26* (2006.01)
(52) U.S. Cl.
CPC .......... *H04L 5/0048* (2013.01); *H04L 5/0051* (2013.01); *H04L 27/2613* (2013.01); *H04L 5/0007* (2013.01)
(58) Field of Classification Search
CPC ... H04L 5/0048; H04L 5/0007; H04L 5/0051; H04L 27/2613; H04W 52/0222;
(Continued)

(56) References Cited

U.S. PATENT DOCUMENTS 8,830,927 B2 * 9/2014 Lunttila ................ H04L 5/0007
370/329
2006/0268880 A1 * 11/2006 Zhao ..................... H04L 1/1812
370/394
(Continued)

FOREIGN PATENT DOCUMENTS

| CN | 101350801 A | 1/2009 |
| CN | 101523840 A | 9/2009 |
| WO | 2009045734 A2 | 4/2009 |

OTHER PUBLICATIONS

International Search Report for corresponding application PCT/CN2014/093508 filed on Dec. 10, 2014; dated Jun. 12, 2015.

*Primary Examiner* — Peter Chen
(74) *Attorney, Agent, or Firm* — Cantor Colburn LLP

(57) ABSTRACT

Provided are a method and device for configuring a pilot, wherein the method includes: configuring a user pilot according to subcarrier indexes of REs occupied by the user pilot, wherein the subcarrier indexes of the REs occupied by the user pilot are in subcarrier indexes of REs occupied by user data on PUSCH, and include the following pilot parameters: REstart and RBnumber, and further include REset and/or REinterval; and adjusting power of a pilot at a transmitting end and performing pilot resource mapping according to Powerfactor corresponding to the pilot parameters, where Powerfactor=(REset+REinterval)/REset. Through the disclosure, the problem that a pilot design scheme of the PUSCH in the related art is poor on flexibility is solved.

16 Claims, 3 Drawing Sheets a user pilot is configured according to subcarrier indexes of REs occupied by the user pilot, wherein the subcarrier indexes of the REs occupied by the user pilot are in subcarrier indexes of REs occupied by user data on PUSCH, and include the following pilot parameters: REstart and RBnumber, and further include REset and/or REinterval  / S202 power of a pilot is adjusted at a transmitting end and pilot resource mapping is performed according to Powerfactor corresponding to the pilot parameters, where Powerfactor=(REset+REinterval)/REset  / S204

(58) Field of Classification Search
CPC ........... H04W 52/0232; H04W 52/143; H04W 52/146; H04W 52/248; H04W 72/04
See application file for complete search history.

(56) References Cited

U.S. PATENT DOCUMENTS

2009/0316675 A1* 12/2009 Malladi ................. H04L 5/0048
370/343
2013/0135984 A1   5/2013 Choi
2014/0254455 A1* 9/2014 Nikopour .......... H04W 72/1273
370/312

* cited by examiner

METHOD AND DEVICE FOR CONFIGURING A PILOT

TECHNICAL FIELD

The disclosure relates to the field of communication, and in particular to a method and device for configuring a pilot.

BACKGROUND

In an uplink of Long Term Evolution (LTE) system, Orthogonal Frequency Division Multiple Access (OFDMA) technology is adopted in a transmission mode of Physical Uplink Shared Channel (PUSCH). On the PUSCH, each user utilizes a length of time-frequency domain Resource Elements (REs) allocated by a system as one's own bands for data transmission and pilot transmission, wherein time-domain indexes of the REs are symbol indexes; frequency-domain indexes are subcarrier indexes; and data and a pilot occupy symbols of different indexes, and subcarriers of the same indexes.

In the related art, the frequency-domain REs occupied by the pilot of the PUSCH are the same as those occupied by the data, and both are determined by two parameters: REstart and REnumber, wherein because PUSCH resource in the LTE is allocated via resource blocks (RB) as minimum units, and the frequency-domain length of one RB includes 12 REs, the REstart should be a start of a RE index of one RB and the REnumber should be an integer multiple of 12. Therefore, the frequency-domain resource occupied by the PUSCH data and pilot in the related art may also be determined by the RBstart and the RBnumber. FIG. 1 is a schematic diagram of PUSCH data and pilot pattern, in a situaition that a normal Cyclic Prefix (CP) in the LTE in the related art is adopted, of one RB in one time slot. As shown in FIG. 1, a pilot and data, in the situaition that the normal CP in the current LTE is adopted, of one RB in one time slot are given.

In particular, multiple users in one user set adopting Multi-User Multiple-Input Multiple-Output (MU-MIMO) (one kind of multi-user multiple input multiple output technology and space division multiplexing technology already used on the PUSCH) may jointly use a section of REs allocated by the system to the users. However, this requires that locations of the REs used by the users are the same and pilot codes corresponding to the pilot should be of strong orthogonality, thereby rendering the design for pilot codes with relative high technical requirements.

Currently, in view of the problem that a pilot design scheme of the PUSCH in the related art is poor on flexibility, no effective solution is provided.

SUMMARY

Embodiments of the disclosure provide a method and device for configuring a pilot for at least solving the problem that a pilot design scheme of the PUSCH in the related art is poor on flexibility.

According to one embodiment of the disclosure, a method for configuring a pilot is provided, including: configuring a user pilot according to subcarrier indexes of REs occupied by the user pilot, wherein the subcarrier indexes of the REs occupied by the user pilot are in subcarrier indexes of REs occupied by user data on PUSCH, and include the following pilot parameters: REstart and RBnumber, and further include REset and/or REinterval, wherein the REstart is a subcarrier index of the first RE in the REs occupied by symbols of the user pilot; the RBnumber is a total number of RBs of symbols of user data; the REset is a minimum number of REs, of which positions are continuous in a frequency-domain, occupied by the user pilot; and the REinterval is the number of subcarriers in an interval between two REsets, which are closest in the frequency-domain, of the user pilot; and adjusting power of a pilot at a transmitting end and performing pilot resource mapping according to Powerfactor corresponding to the pilot parameters, where Powerfactor=(REset+REinterval)/REset.

In an example embodiment, when the REinterval is 0, the subcarrier indexes of the REs occupied by the user pilot do not include the Reset, and the Powerfactor is 1.

In an example embodiment, configuring the user pilot according to the subcarrier indexes of the REs occupied by the user pilot includes: in candidate pilot configuration provided by a system, choosing pilot configuration matching with data time-frequency resource of a user.

In an example embodiment, in the candidate pilot configuration provided by the system, pilot configuration, of which the REinterval is 0, corresponds to traditional data time-frequency resource.

In an example embodiment, adjusting the power of the pilot at the transmitting end and performing the pilot resource mapping according to the Powerfactor corresponding to the pilot parameters includes: according to the number of REs actually used by a user, generating, at the transmitting end, a pilot code with a length corresponding to the number of the REs actually used by the user; multiplying the pilot code by the Powerfactor to obtain a pilot code whose power is adjusted, and performing, according to a pilot pattern, the pilot resource mapping for the pilot code whose power is adjusted.

According to another embodiment of the disclosure, a device for configuring a pilot is provided, including: a configuring component, configured to configure a user pilot according to subcarrier indexes of REs occupied by the user pilot, wherein the subcarrier indexes of the REs occupied by the user pilot are in subcarrier indexes of REs occupied by user data on PUSCH, and include the following pilot parameters: REstart and RBnumber, and further include REset and/or REinterval, wherein the REstart is a subcarrier index of the first RE in the REs occupied by symbols of the user pilot; the RBnumber is a total number of RBs of symbols of user data; the REset is a minimum number of REs, of which positions are continuous in a frequency-domain, occupied by the user pilot; and the REinterval is the number of subcarriers in an interval between two REsets, which are closest in the frequency-domain, of the user pilot; and an adjusting component, configured to adjust power of a pilot at a transmitting end and perform pilot resource mapping according to Powerfactor corresponding to the pilot parameters, where Powerfactor=(REset+REinterval)/REset.

In an example embodiment, when the REinterval is 0, the subcarrier indexes of the REs occupied by the user pilot do not include the Reset, and the Powerfactor is 1.

In an example embodiment, the configuring component is configured to choose, in candidate pilot configuration provided by a system, pilot configuration matching with data time-frequency resource of a user.

In an example embodiment, in the candidate pilot configuration provided by the system, pilot configuration, of which the REinterval is 0, corresponds to traditional data time-frequency resource.

In an example embodiment, the adjusting component includes: a generating element, configured to, according to the number of REs actually used by a user, generate, at the transmitting end, a pilot code with a length corresponding to the number of the REs actually used by the user; and a mapping element, configured to multiply the pilot code by the Powerfactor to obtain a pilot code whose power is adjusted, and perform, according to a pilot pattern, the pilot resource mapping for the pilot code whose power is adjusted.

According to the embodiment of the disclosure, by the way of configuring a user pilot according to subcarrier indexes of Res occupied by the user pilot, wherein the subcarrier indexes of the REs occupied by the user pilot are in subcarrier indexes of REs occupied by user data on PUSCH, and include the following pilot parameters: REstart and RBnumber, and further include REset and/or REinterval, wherein the REstart is a frequency-domain index of the first RE in the REs occupied by symbols of the user pilot; the RBnumber is a total number of RBs of symbols of user data; the REset is a minimum number of REs, of which positions are continuous in a frequency-domain, occupied by the user pilot; and the REinterval is the number of subcarriers in an interval between two REsets, which are closest in the frequency-domain, of the user pilot; and adjusting power of a pilot at a transmitting end and performing pilot resource mapping according to Powerfactor corresponding to the pilot parameters, where Powerfactor=(REset+REinterval)/REset, the problem that a pilot design scheme of the PUSCH in the related art is poor on flexibility is solved so that the REs with different frequency-domain magnitudes can be flexibly allocated for a space division user and a solution can be provided for no-load measurement.

BRIEF DESCRIPTION OF THE DRAWINGS

The drawings described herein are intended to provide further understanding of the disclosure and constitute a part of the disclosure. The exemplary embodiments of the disclosure and description thereof are intended to explain the disclosure and do not form improper limits to the disclosure. In the drawings.

DETAILED DESCRIPTION OF THE EMBODIMENTS

The disclosure is described below with reference to the drawings and the embodiments in detail. It is noted that the embodiments of the disclosure and the features of the embodiments can be combined with each other if there is no conflict.

In view of the above problem, the embodiment provides a method for designing an uplink pilot. The method for designing a pilot on PUSCH ensures the compatibility with a traditional pilot scheme of the current LTE system, and realizes that the REs with different frequency-domain magnitudes can be flexibly allocated for a space division user, in a scene that space division multiplexing characteristics are used, and a solution can be provided for no-load measurement.

Figure 1:
FIG. 1 is a schematic diagram of PUSCH data and pilot pattern, in the situaition that a normal CP in the LTE in the related art is adopted, of one RB in one time slot.
Figure 2:
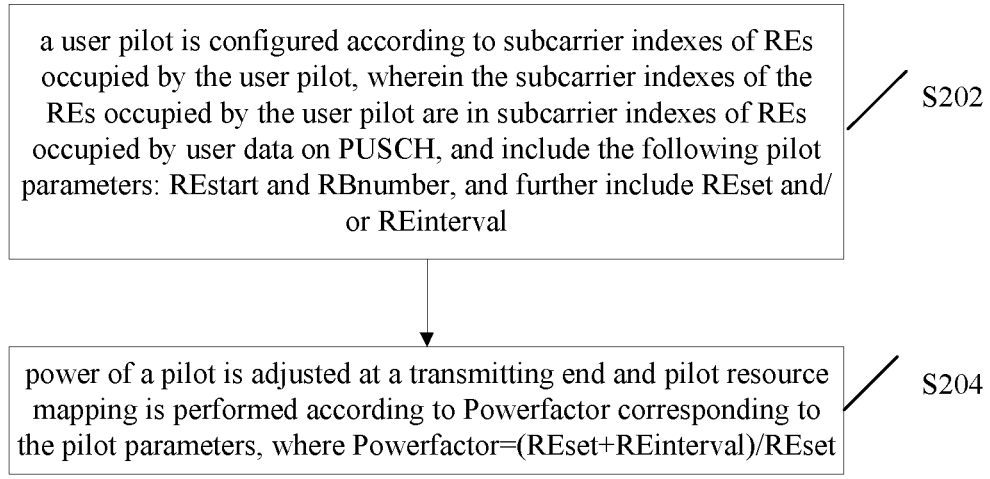
FIG. 2 is a flowchart of a method for configuring a pilot according to an embodiment of the disclosure.

FIG. 2 is a flowchart of a method for configuring a pilot according to an embodiment of the disclosure. As shown in FIG. 2, the method includes the following steps:

Step 202: a user pilot is configured according to subcarrier indexes of REs occupied by the user pilot, wherein the subcarrier indexes of the REs occupied by the user pilot are in subcarrier indexes of REs occupied by user data on PUSCH, and include the following pilot parameters: REstart and RBnumber, and further include REset and/or REinterval, wherein the REstart is a subcarrier index of the first RE in the REs occupied by symbols of the user pilot; the RBnumber is a total number of RBs of symbols of user data; the REset is a minimum number of REs, of which positions are continuous in a frequency-domain, occupied by the user pilot; and the REinterval is the number of subcarriers in an interval between two REsets, which are closest in the frequency-domain, of the user pilot.

Step 204: power of a pilot is adjusted at a transmitting end and pilot resource mapping is performed according to Powerfactor corresponding to the pilot parameters, where Powerfactor=(REset+REinterval)/REset.

In the embodiment, through the above steps, due to the pilot parameters REset and/or REinterval added newly to the subcarrier indexes of the REs, which further describe specific situations about the REs of the user pilot, the problem that a pilot design scheme of the PUSCH in the related art is poor on flexibility is solved so that the REs with different frequency-domain magnitudes can be flexibly allocated for a space division user and a solution can be provided for no-load measurement.

In an example embodiment, when the REinterval is 0, the subcarrier indexes of the REs occupied by the user pilot may not include the Reset, and the Powerfactor is 1. Namely, when the REinterval is 0, the configuration may be described just by the REinterval parameter.

In an example embodiment, the step that the user pilot is configured according to the subcarrier indexes of the REs occupied by the user pilot includes: in candidate pilot configuration provided by a system, pilot configuration matching with data time-frequency resource of a user is chosen. Meanwhile, in the candidate pilot configuration provided by the system, pilot configuration, of which the REinterval is 0, may be taken as the pilot configuration corresponding to traditional data time-frequency resource. In this way, the compatibility with a traditional pilot configuration scheme can be realized.

In an example embodiment, the specific way to adjust the power of the pilot at the transmitting end and perform the pilot resource mapping according to the Powerfactor corresponding to the pilot parameters may be as follows: according to the number of REs actually used by a user, a pilot code with a length corresponding to the number of the REs actually used by the user is generated at the transmitting end; the pilot code is multiplied by the Powerfactor to obtain a pilot code whose power is adjusted, and the pilot resource mapping is performed, according to a pilot pattern, for the pilot code whose power is adjusted.

Corresponding to the above method, the embodiment further provides a device for configuring a pilot, which is configured to realize the above embodiments and the example embodiments, and those described would not be repeated. As used hereinafter, term "component" can realize the combination of software and/or hardware with predetermined functions. Although the device described in the embodiments below are preferably realized through software, the realization through hardware or through the combination of software and hardware is also possible and can be conceived.

Figure 3:
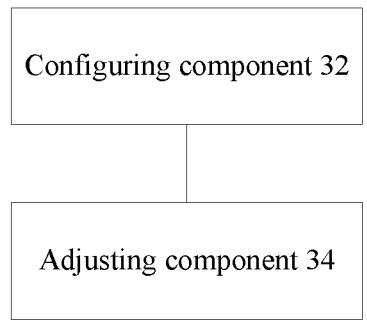
FIG. 3 is a structural diagram of a device for configuring a pilot according to an embodiment of the disclosure.

FIG. 3 is a structural diagram of a device for configuring a pilot according to an embodiment of the disclosure. As shown in FIG. 3, the device includes a configuring component 32 and an adjusting component 34, and each component is described in detail hereinafter.

The configuring component 32 is configured to configure a user pilot according to subcarrier indexes of REs occupied by the user pilot, wherein the subcarrier indexes of the REs occupied by the user pilot are in subcarrier indexes of REs occupied by user data on PUSCH, and include the following pilot parameters: REstart and RBnumber, and further include REset and/or REinterval, wherein the REstart is a subcarrier index of the first RE in the REs occupied by symbols of the user pilot; the RBnumber is a total number of RBs of symbols of user data; the REset is a minimum number of REs, of which positions are continuous in a frequency-domain, occupied by the user pilot; and the REinterval is the number of subcarriers in an interval between two REsets, which are closest in the frequency-domain, of the user pilot. The adjusting component 34 is coupled to the configuring component 32, and is configured to adjust power of a pilot at a transmitting end and performing pilot resource mapping according to Powerfactor corresponding to the pilot parameters, where Powerfactor=(REset+REinterval)/REset.

The system determines a scheduling message of each user (including the use situation of the resource and the pilot) through the configuring component 32, notifies a terminal through a certain mechanism, and then the terminal may perform the above adjusting component 34 according to the scheduling message to generate a signal corresponding to the resource and the pilot.

In an example embodiment, when the REinterval is 0, the subcarrier indexes of the REs occupied by the user pilot may not include the Reset, and the Powerfactor is 1. Namely, when the REinterval is 0, the configuration may be described just by the REinterval parameter.

In an example embodiment, the configuring component 32 may be configured to choose, in candidate pilot configuration provided by a system, pilot configuration matching with data time-frequency resource of a user. Meanwhile, in the candidate pilot configuration provided by the system, pilot configuration, of which the REinterval is 0, may be taken as the pilot configuration corresponding to traditional data time-frequency resource. In this way, the compatibility with a traditional pilot configuration scheme can be realized.

In an example embodiment, the adjusting component 34 can include a generating element, configured to, according to the number of REs actually used by a user, generate, at the transmitting end, a pilot code with a length corresponding to the number of the REs actually used by the user, and a mapping unit, coupled to the generating unit, and configured to multiply the pilot code by the Powerfactor to obtain a pilot code whose power is adjusted, and perform, according to a pilot pattern, the pilot resource mapping for the pilot code whose power is adjusted.

Description is made hereinafter in combination with example embodiments, and the following example embodiments combine the above embodiments and example embodiments thereof.

In the following example embodiments, a method for designing a pilot of channel estimation on uplink of the LTE system is provided. The method can solve that problem that the REs of space division multiplexing users should be the same when space division multiplexing is performed on the PUSCH. Meanwhile, the pilot of the example embodiments may be used for non space division multiplexing users. At this time, it is convenient to measure a signal on no load.

The example embodiments are configured through the full use of symbols in the current PUSCH, thus the symbol indexes of the RE are omitted in the following description.

The allocation rule of frequency-domain REs occupied by user data given in the example embodiments are the same as that of related way. The subcarrier indexes of the REs occupied by the user pilot are in subcarrier indexes of REs occupied by user data and determined by the following pilot parameters: (1) REstart, a subcarrier index of the first RE in the REs occupied by symbols of the user pilot; (2) RBnumber, a total number of RBs of symbols of user data; (3) REset, a minimum number of REs, of which positions are continuous in a frequency-domain, occupied by the user pilot, and (4) REinterval, the number of subcarriers in an interval between two REsets, which are closest in the frequency-domain, of the user pilot. Meanwhile, for different choices about pilot parameters, the parameter Powerfactor is added to adjust power of a transmitting end, wherein Powerfactor=(REset+REinterval)/REset.

In the pilot design of the example embodiments, parameters REset and REinterval are used to represent each pilot configuration. Specially, when the REinterval=0, only one parameter the REinterval is needed to represent the pilot configuration.

In the candidate pilot configuration, the system gives a mapping method of pilot RE matching data time-frequency resource of a user.

To be compatible with the related art, the candidate pilot configuration of the system may have at least one option corresponding to the current pilot configuration, and the option is the pilot configuration corresponding to the REinterval=0.

One way to adjust the power is that according to the number of REs actually used by a user, a pilot code with a length corresponding to the number of the REs actually used by the user is generated, at the transmitting end; the pilot code is multiplied by the Powerfactor to obtain a pilot code whose power is adjusted, which is used for performing, according to a pilot pattern, the pilot resource mapping.

The beneficial effects brought by the example embodiments are that resource can be flexibly allocated for a space division user on the PUSCH and that it is convenient in no-load measurement for a non space division user on the PUSCH.

Embodiment 1

The example embodiment takes the LTE system, in which the pilot design provided in the above embodiment is applied, as an example for illustration. Table 1 is a collection table of candidate pilot configuration in the system according to the example embodiment 1 of the disclosure. As shown in Table 1, there are two kinds of candidate pilot configuration. In the embodiment, the system schedules three terminal users, referred to as user equipment 1 (UE1), user equipment 2 (UE2), and user equipment 3 (UE3), wherein UE1 and UE2 satisfy requirements as a space division user on the PUSCH. Table 2 is a pilot parameter allocation table according to the example embodiment 1 of the disclosure, and parameters of pilot pattern of the three users are shown in Table 2.

TABLE 1

| Configuration | REset | REinterval |
|---|---|---|
| 0 | — | 0 |
| 1 | 1 | 1 |

TABLE 2

| UE | REstart | RBnumber | REset | REinterval | Powerfactor |
|---|---|---|---|---|---|
| UE1 | 0 | 2 | 1 | 1 | 2 |
| UE2 | 1 | 1 | 1 | 1 | 2 |
| UE3 | 24 | 1 | — | 0 | 1 |

Figure 4:
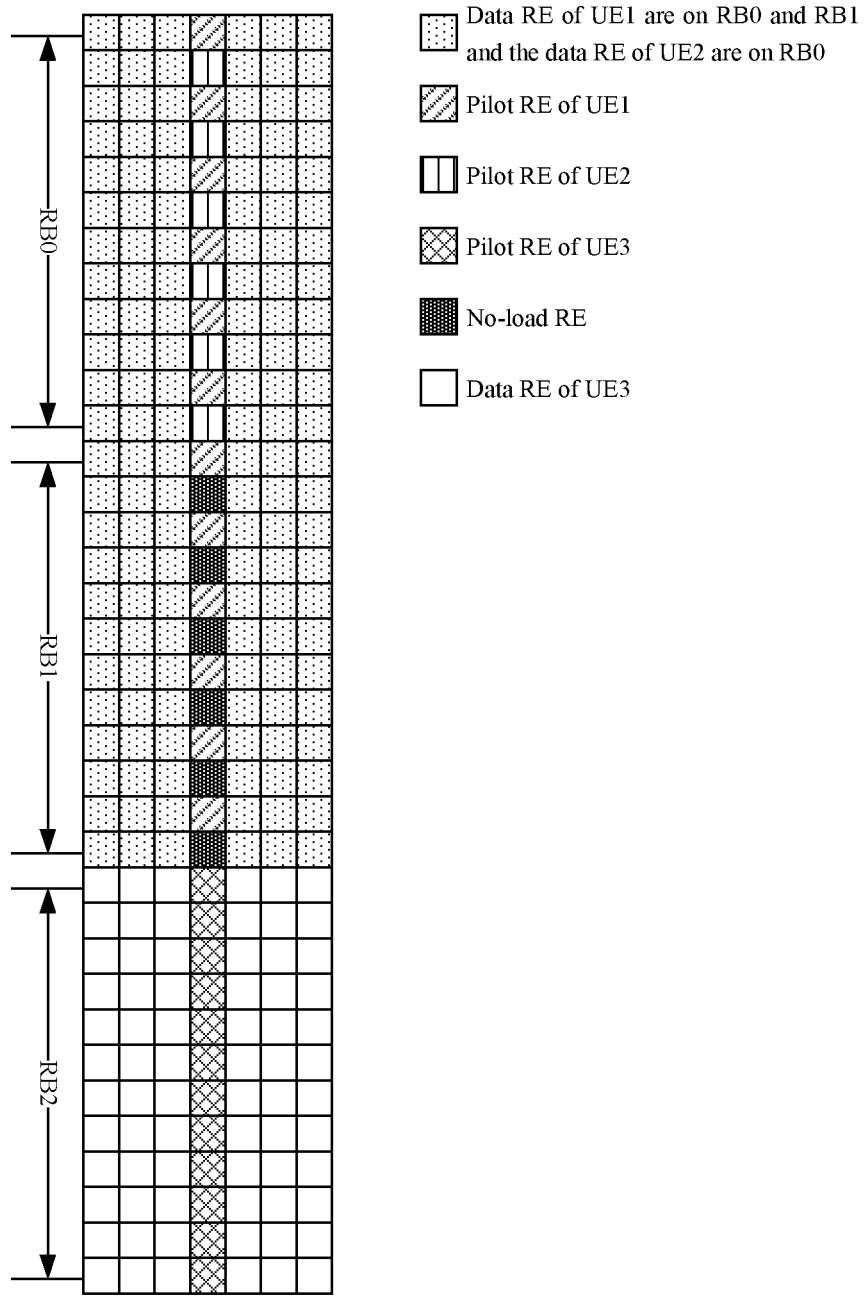
FIG. 4 is a schematic diagram of PUSCH data and pilot source mapping, in the situation that a normal CP is adopted, of one time slot according to the example embodiment 1 of the disclosure.

FIG. 4 is a schematic diagram of PUSCH data and pilot source mapping, in the situation that a normal CP is adopted, of one time slot according to the example embodiment 1 of the disclosure. As shown in FIG. 4, the diagram for allocating time-frequency resource in one PUSCH time slot in the situation that a normal CP is adopted for the three users, wherein the magnitudes of the time-frequency resource allocated to UE1 and UE2 are different, part of RBs are overlapping in data symbols, the pilot design of configuration 1 is used in terms of the pilot, and no load may be used for measurement. The way for allocating time-frequency domain resource of the pilot of UE3 and time-frequency domain resource of the data of UE3 is the same as that in the related art.

After the pilot code is generated, the user multiplies the amplitude of the pilot code by the Powerfactor corresponding to the user to obtain a pilot code, wherein the pilot code obtained is taken as the pilot code of the user.

Embodiment 2

Figure 5:
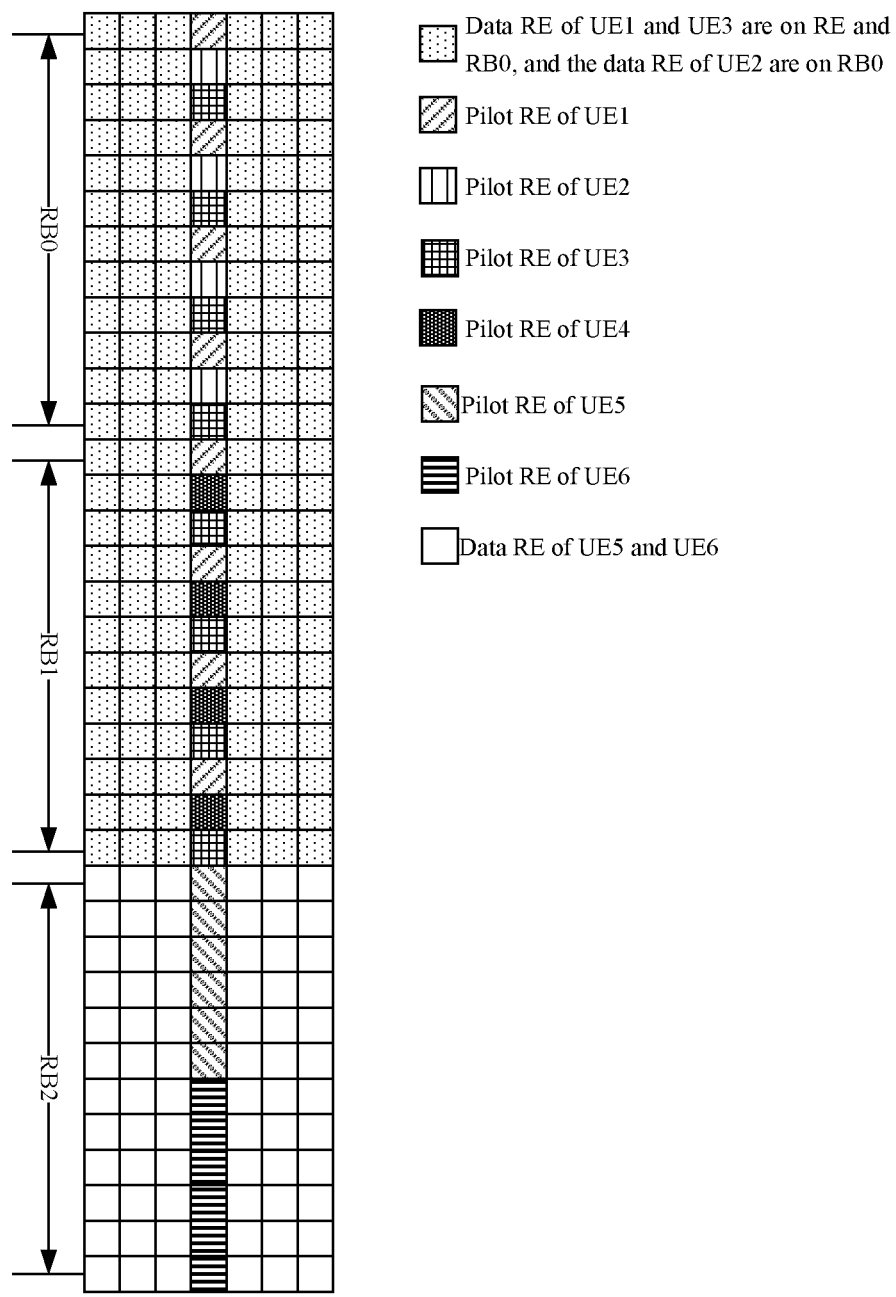
FIG. 5 is a schematic diagram of PUSCH data and pilot source mapping, in the situation that a normal CP is adopted, of one time slot according to the example embodiment 2 of the disclosure.

The example embodiment takes the LTE system, in which the pilot design provided in the above embodiment is applied, as an example for illustration. Table 3 is a collection table of candidate pilot configuration in the system according to the example embodiment 2 of the disclosure. As shown in Table 3, there are five kinds of candidate pilot configuration. In the embodiment, the system schedules six terminal users, referred to as user equipment 1 (UE1), user equipment 2 (UE2), user equipment 3 (UE3), user equipment 4 (UE4), user equipment 5 (UE5), and user equipment 6 (UE6). Table 4 is a pilot parameter allocation table according to the example embodiment 2 of the disclosure, and parameters of pilot pattern of the six users are shown in Table 4. FIG. 5 is a schematic diagram of PUSCH data and pilot source mapping, in the situation that a normal CP is adopted, of one time slot according to the example embodiment 2 of the disclosure. As shown in FIG. 5, the pilot source mapping and data of user is shown in the figure.

TABLE 3

| Configuration | REset | REinterval |
|---|---|---|
| 0 | — | 0 |
| 1 | 1 | 2 |
| 2 | 2 | 1 |
| 3 | 3 | 3 |
| 4 | 6 | 6 |

TABLE 4

| UE | REstart | RBnumber | REset | REinterval | Powerfactor |
|---|---|---|---|---|---|
| UE1 | 0 | 2 | 1 | 2 | 3 |
| UE2 | 1 | 1 | 1 | 2 | 3 |
| UE3 | 2 | 2 | 1 | 2 | 3 |
| UE4 | 13 | 1 | 1 | 2 | 3 |
| UE5 | 24 | 1 | 6 | 6 | 2 |
| UE5 | 30 | 1 | 6 | 6 | 2 |

After the pilot code is generated, the user multiplies the amplitude of the pilot code by the Powerfactor corresponding to the user to obtain a pilot code, wherein the pilot code obtained is taken as the pilot code of the user.

In another embodiment, a kind of software is further provided, and the software is used for performing technical solutions described in the above embodiments and the example embodiments.

In another embodiment, a storage medium is further provided. The storage medium stores the above software, including but not limiting to a compact disk, a floppy disk, a hard disk and a rewritable storage.

Obviously, those skilled in the art should understand that all components or all steps in the embodiments of the disclosure can be realized by using a generic computation apparatus, can be centralized on a single computation apparatus or can be distributed on a network composed of a plurality of computation apparatuses. Optionally, they can be realized by using executable program codes of the computation apparatuses. Thus, they can be stored in a storage apparatus and executed by the computation apparatuses, the shown or described steps can be executed in a sequence different from this sequence under certain conditions, or they are manufactured into each integrated circuit component respectively, or a plurality of components or steps therein are manufactured into a single integrated circuit component. Thus, the disclosure is not limited to a combination of any specific hardware and software.

The above is only the example embodiments of the disclosure, and is not intended to limit the disclosure. There can be various modifications and variations in the disclosure for those skilled in the art. Any modifications, equivalent replacements, improvements and the like within the principle of the disclosure shall fall within the protection scope of the disclosure.

INDUSTRIAL APPLICABILITY

As mentioned above, the method and device for configuring a pilot provided in the embodiments of the disclosure have the following beneficial effects: the problem that a pilot design scheme of the PUSCH in the related art is poor on flexibility is solved so that the REs with different frequency-domain magnitudes can be flexibly allocated for a space division user and a solution can be provided for no-load measurement.

What is claimed is:

1. A method for configuring a pilot, comprising:
configuring a user pilot according to subcarrier indexes of Resource Elements (REs) occupied by the user pilot, wherein the subcarrier indexes of the REs occupied by the user pilot are in subcarrier indexes of REs occupied by user data on Physical Uplink Shared Channel (PUSCH), and comprise the following pilot parameters:
REstart and RBnumber, and further comprise REset and REinterval, wherein the REstart is a subcarrier index of the first RE in the REs occupied by symbols of the user pilot; the RBnumber is a total number of Resource Blocks (RBs) of symbols of the user data; the REset is a minimum number of REs, of which positions are continuous in a frequency-domain, occupied by the user pilot; and the REinterval is the number of subcarriers in an interval between two REsets, which are closest in the frequency-domain, of the user pilot; and adjusting power of a pilot at a transmitting end and performing pilot resource mapping according to Powerfactor corresponding to the pilot parameters, where Powerfactor=(REset+REinterval)/REset.

2. The method as claimed in claim 1, wherein when the REinterval is 0, the subcarrier indexes of the REs occupied by the user pilot do not comprise the REset, and the Powerfactor is 1.

3. The method as claimed in claim 1, wherein configuring the user pilot according to the subcarrier indexes of the REs occupied by the user pilot comprises:

in candidate pilot configuration provided by a system, choosing pilot configuration matching with time-frequency resource allocated for a user corresponding to the user data.

4. The method as claimed in claim 3, wherein
in the candidate pilot configuration provided by the system, pilot configuration, of which the REinterval is 0, corresponds to traditional time-frequency resource allocated for the user.

5. The method as claimed in claim 1, wherein adjusting the power of the pilot at the transmitting end and performing the pilot resource mapping according to the Powerfactor corresponding to the pilot parameters comprises:

according to the number of REs actually used by a user, generating, at the transmitting end, a pilot code with a length corresponding to the number of the REs actually used by the user;

multiplying the pilot code by the Powerfactor to obtain a pilot code whose power is adjusted, and performing, according to a pilot pattern, the pilot resource mapping for the pilot code whose power is adjusted.

6. A device for configuring a pilot, comprising:
a configuring component, configured to configure a user pilot according to subcarrier indexes of REs occupied by the user pilot, wherein the subcarrier indexes of the REs occupied by the user pilot are in subcarrier indexes of REs occupied by user data on PUSCH, and comprise the following pilot parameters:

REstart and RBnumber, and further comprise REset and REinterval, wherein the REstart is a subcarrier index of the first RE in the REs occupied by symbols of the user pilot; the RBnumber is a total number of RBs of symbols of the user data; the REset is a minimum number of REs, of which positions are continuous in a frequency-domain, occupied by the user pilot; and the REinterval is the number of subcarriers in an interval between two REsets, which are closest in the frequency-domain, of the user pilot; and an adjusting component, configured to adjust power of a pilot at a transmitting end and perform pilot resource mapping according to Powerfactor corresponding to the pilot parameters, where Powerfactor=(REset+REinterval)/REset.

7. The device as claimed in claim 6, wherein when the REinterval is 0, the subcarrier indexes of the REs occupied by the user pilot do not comprise the REset, and the Powerfactor is 1.

8. The device as claimed in claim 6, wherein the configuring component is configured to choose, in candidate pilot configuration provided by a system, pilot configuration matching with time-frequency resource of occupied by the user data.

9. The device as claimed in claim 8, wherein
in the candidate pilot configuration provided by the system, pilot configuration, of which the REinterval is 0, corresponds to traditional time-frequency resource occupied by the user data.

10. The device as claimed in claim 6, wherein the adjusting component comprises:

a generating element, configured to, according to the number of REs actually used by a user, generate, at the transmitting end, a pilot code with a length corresponding to the number of the REs actually used by the user; and a mapping element, configured to multiply the pilot code by the Powerfactor to obtain a pilot code whose power is adjusted, and perform, according to a pilot pattern, the pilot resource mapping for the pilot code whose power is adjusted.

11. The method as claimed in claim 2, wherein adjusting the power of the pilot at the transmitting end and performing the pilot resource mapping according to the Powerfactor corresponding to the pilot parameters comprises:

according to the number of REs actually used by a user, generating, at the transmitting end, a pilot code with a length corresponding to the number of the REs actually used by the user;

multiplying the pilot code by the Powerfactor to obtain a pilot code whose power is adjusted, and performing, according to a pilot pattern, the pilot resource mapping for the pilot code whose power is adjusted.

12. The method as claimed in claim 3, wherein adjusting the power of the pilot at the transmitting end and performing the pilot resource mapping according to the Powerfactor corresponding to the pilot parameters comprises:

according to the number of REs actually used by a user corresponding to the user data, generating, at the transmitting end, a pilot code with a length corresponding to the number of the REs actually used by the user;

multiplying the pilot code by the Powerfactor to obtain a pilot code whose power is adjusted, and performing, according to a pilot pattern, the pilot resource mapping for the pilot code whose power is adjusted.

13. The method as claimed in claim 4, wherein adjusting the power of the pilot at the transmitting end and performing the pilot resource mapping according to the Powerfactor corresponding to the pilot parameters comprises:

according to the number of REs actually used by a user corresponding to the user data, generating, at the transmitting end, a pilot code with a length corresponding to the number of the REs actually used by the user;

multiplying the pilot code by the Powerfactor to obtain a pilot code whose power is adjusted, and performing, according to a pilot pattern, the pilot resource mapping for the pilot code whose power is adjusted.

14. The device as claimed in claim 7, wherein the adjusting component comprises:

a generating element, configured to, according to the number of REs actually used by a user corresponding to the user data, generate, at the transmitting end, a pilot code with a length corresponding to the number of the REs actually used by the user; and a mapping element, configured to multiply the pilot code by the Powerfactor to obtain a pilot code whose power is adjusted, and perform, according to a pilot pattern, the pilot resource mapping for the pilot code whose power is adjusted.

15. The device as claimed in claim 8, wherein the adjusting component comprises:
   a generating element, configured to, according to the number of REs actually used by a user corresponding to the user data, generate, at the transmitting end, a pilot code with a length corresponding to the number of the REs actually used by the user; and
   a mapping element, configured to multiply the pilot code by the Powerfactor to obtain a pilot code whose power is adjusted, and perform, according to a pilot pattern, the pilot resource mapping for the pilot code whose power is adjusted.

16. The device as claimed in claim 9, wherein the adjusting component comprises:
   a generating element, configured to, according to the number of REs actually used by a user corresponding to the user data, generate, at the transmitting end, a pilot code with a length corresponding to the number of the REs actually used by the user; and
   a mapping element, configured to multiply the pilot code by the Powerfactor to obtain a pilot code whose power is adjusted, and perform, according to a pilot pattern, the pilot resource mapping for the pilot code whose power is adjusted.

\* \* \* \* \*